US010329137B1

(12) United States Patent
Prasad et al.

(10) Patent No.: US 10,329,137 B1
(45) Date of Patent: Jun. 25, 2019

(54) SYSTEM AND METHOD FOR OPERATING A FUEL DISPENSING APPARATUS

(71) Applicant: United Services Automobile Association, San Antonio, TX (US)

(72) Inventors: Bharat Prasad, San Antonio, TX (US); Charles L. Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 969 days.

(21) Appl. No.: 14/640,135

(22) Filed: Mar. 6, 2015

Related U.S. Application Data

(60) Provisional application No. 61/991,815, filed on May 12, 2014.

(51) Int. Cl.
*G06Q 30/00* (2012.01)
*B67D 7/34* (2010.01)
(Continued)

(52) U.S. Cl.
CPC .............. *B67D 7/348* (2013.01); *B67D 7/04* (2013.01); *B67D 7/0401* (2013.01); *B67D 7/32* (2013.01);
(Continued)

(58) Field of Classification Search
CPC .......... B67D 7/06; B67D 7/04; B67D 7/0401; B67D 7/0403; B67D 7/0405; B67D 7/0407; B67D 7/0409; B67D 7/0411; B67D 7/0413; B67D 7/0415; B67D 7/0417; B67D 7/0419; B67D 7/0421; B67D 7/0423; B67D 7/0425; B67D 7/0426; B67D 7/0428; B67D 7/043; B67D 7/032; B67D 7/0432;
(Continued)

(56) References Cited

U.S. PATENT DOCUMENTS

| | | | |
|---|---|---|---|
| 6,363,299 B1* | 3/2002 | Hartsell, Jr. ........... | B67D 7/145 700/236 |
| 2003/0028285 A1* | 2/2003 | Zura .................... | G06Q 10/08 700/241 |

(Continued)

OTHER PUBLICATIONS

Pay Less at the Gas Pump This Summer by Kevin O'Reilly, CFP® on Apr. 30, 2013 in Spending (Year: 2013).*

*Primary Examiner* — William J Allen
(74) *Attorney, Agent, or Firm* — Baker & Hostetler LLP

(57) ABSTRACT

A fuel dispenser including one or more processors in a local or distributed computing system provide techniques for smart fuel dispensing that represent a marriage of vehicle telematics data, a smart fuel dispenser, and a customer device (e.g., a mobile device, tablet, computer, etc.). The techniques disclosed particularly provide a customizable fueling experience to customers and, for example, communicate fuel dispensing configuration information to/from a customer, pair vehicles to a fueling dispenser (e.g., using combinations of vehicle telematics, mobile phone data, fuel dispensing data, etc.), initiate/terminate fueling sessions, recommend fuel grades, establish customer accounts for various payment options, and look forward to potential itineraries (e.g., planned trips) to provide recommendations for vehicle maintenance, fuel grades, additives, etc.).

15 Claims, 6 Drawing Sheets

(51) Int. Cl.
*B67D 7/04* (2010.01)
*G06Q 20/14* (2012.01)
*G06Q 20/32* (2012.01)
*B67D 7/32* (2010.01)
*G06Q 20/16* (2012.01)
*G06Q 30/06* (2012.01)

(52) U.S. Cl.
CPC ........... *G06Q 20/145* (2013.01); *G06Q 20/16* (2013.01); *G06Q 20/327* (2013.01); *G06Q 20/3224* (2013.01); *B67D 2007/0442* (2013.01); *G06Q 30/0601* (2013.01)

(58) Field of Classification Search
CPC .. B67D 7/0434; B67D 7/0436; B67D 7/0438; B67D 7/044; B67D 7/0442; B67D 7/0444; B67D 7/0446; B67D 7/0448; B67D 7/0449; B67D 7/0451; B67D 7/0453; B67D 7/0455; B67D 7/0457; B67D 7/0459; B67D 7/0461; B67D 7/0463; B67D 7/0465; B67D 7/0467; B67D 7/0469; B67D 7/0471; B67D 7/0479; B67D 7/0474; B67D 7/064–7/068; B67D 7/08; B67D 7/22; B67D 7/32–7/3263; B67D 7/58; G07B 15/00
See application file for complete search history.

(56) References Cited

U.S. PATENT DOCUMENTS

| | | | |
|---|---|---|---|
| 2005/0000588 A1* | 1/2005 | Webb | B67D 7/04 141/94 |
| 2011/0137470 A1* | 6/2011 | Surnilla | G01C 21/26 700/282 |
| 2011/0288721 A1* | 11/2011 | Christensen | G06Q 20/40 701/29.5 |
| 2014/0100692 A1* | 4/2014 | Chittenden, Jr. | G07F 15/001 700/236 |

* cited by examiner

SYSTEM AND METHOD FOR OPERATING A FUEL DISPENSING APPARATUS

CROSS REFERENCE TO RELATED APPLICATIONS

This application claims priority to U.S. patent application Ser. No. 61/991,815 filed May 12, 2014 which is incorporated by reference in its entirety.

FIELD OF THE INVENTION

This invention relates generally to systems for dispensing fuel, and in particular to intelligent fuel dispensing systems.

BACKGROUND OF THE INVENTION

Conventional fuel dispensers permit customers to dispense fuel into customer vehicles. The fueling process follows traditional steps and includes stopping a customer vehicle in near proximity to a fuel dispenser (e.g., a pump), opening a fuel port of the vehicle (e.g., a gasoline tank), selecting a fuel grade or type, dispensing fuel into the vehicle, and payment. Additional steps can be included as necessary depending on, for example, payment type, etc.

However, conventional fuel dispensers do not provide additional services or any enhanced experience to the customer. The present invention is directed to providing additional services and/or an enhanced fueling experience over existing fuel dispensing systems.

SUMMARY OF THE INVENTION

As discussed herein, the subject disclosure provides techniques for smart fuel dispensing that represents a marriage of vehicle telematics data, a smart fuel dispenser, and a customer device (e.g., a mobile device, tablet, computer, etc.). The fuel dispenser, including one or more processors in a local or distributed computing system particularly provide a customizable fueling experience to customers. According to the subject embodiments discussed herein, these techniques communicate fuel dispensing configuration information to/from a customer, pair vehicles to a fueling dispenser (e.g., using combinations of vehicle telematics, mobile phone data, fuel dispensing data, etc.), initiate/terminate fueling sessions, recommend fuel grades, establish customer accounts for various payment options, and look forward to potential itineraries (e.g., planned trips) to provide recommendations for vehicle maintenance, fuel grades, additives, etc.).

According to one particular embodiment of the subject disclosure, a fuel dispenser receives telematics data such as vehicle identification data for a corresponding vehicle. Such telematics data can be generated from a vehicle device (Onboard Device (OBD)), or from a customer device (e.g., a mobile phone, etc.). The fuel dispenser initiates a fueling session associated with the vehicle identification data and determines a location of the vehicle based on at least one of the telematics data and a location of the mobile device associated with the vehicle. The fuel dispenser permits fuel to dispense when the vehicle is within a predetermined proximity with the fuel dispenser. The fuel dispenser further terminates the fueling session when, for example, a customer holsters a fuel nozzle/handle and/or the location of the vehicle exceeds the predetermined proximity. Once terminated, the fuel dispenser prevents fuel from dispensing.

In certain embodiments, the fuel dispenser determines an account associated with vehicle identification data. In some embodiments, the account can include an account balance, while in other embodiments the account may function on a credit-system. The fuel dispenser determines a total value of fuel dispensed for the fueling session and, when operating on an account balance, it deducts the total value of fuel dispensed for the fueling session from the account balance. The fuel dispenser further notifies an owner of the account (e.g., associated with the vehicle identification data) that the total value of fuel dispensed was deducted from the account balance. In a credit and/or an account system, the fuel dispenser can also generate a statement of an aggregated total value of fuel dispensed over a predetermined period of time and notify an owner of the account the statement of the aggregated total value of fuel dispensed over the predetermined period of time. Such notification can include, for example, electronic communications (e.g., text messages, emails, etc.), paper statements, receipts at the fuel dispenser, and the like.

According to another embodiment of the subject disclosure, a fuel dispenser receives telematics data regarding a vehicle. Such telematics data can include, for example vehicle diagnostics including engine timing data and itinerary data regarding an upcoming trip, etc. Such telematics data can be generated or sourced from a vehicle (e.g., a vehicle OBD) or a customer device (e.g., a mobile phone and the like). The fuel dispenser further determines an optimal fuel type such as an octane grade for the vehicle based on the telematics data. For example, certain engine timing requires specific minimum octane grades to prevent knocking. Additionally, with respect to a planned trip (e.g., itinerary data), the geographic location of the trip may include particular altitudes where specific fuel grades are recommended for the vehicle. The fuel dispenser is also configured to determine local lexicon or nomenclature for fuel octane grades (e.g., "regular", "super", etc.) and provide the appropriate optimal fuel type for the vehicle to display to the customer. With respect to display, the fuel dispenser can display the appropriate optimal fuel type on a fuel dispenser display, transmit the optimal fuel type to a customer device for display (e.g., a mobile phone), and/or transmit the optimal fuel type to the vehicle for display. A customer is prevented from dispensing non-optimal fuel types since the fuel dispenser prevents non-optimal fuel from dispensing.

In additional embodiments, the fuel dispenser also determines one or more recommended fuel additives based on the vehicle diagnostics data and provides such recommended fuel additives to a display.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DESCRIPTION OF EXAMPLE EMBODIMENTS

Figure 1:
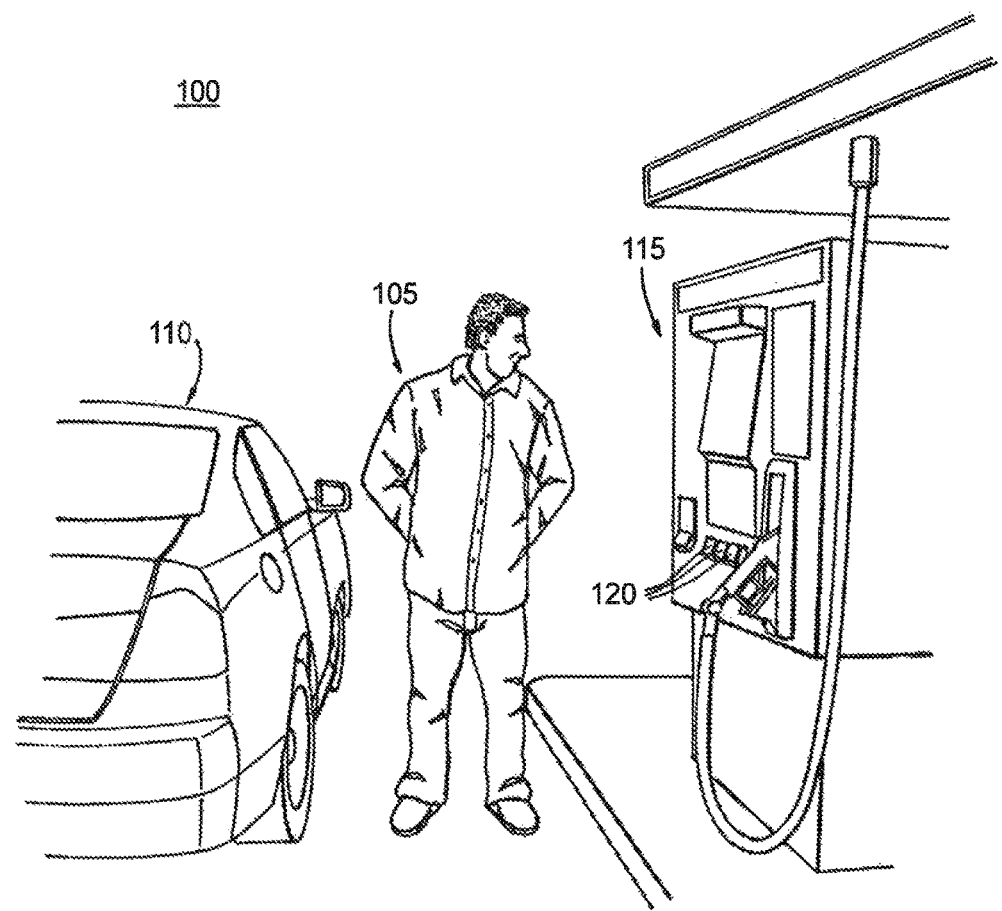
FIG. 1 illustrates a schematic diagram view of a conventional fuel dispensing system.

Reference will now be made to the drawings. For purposes of explanation and illustration, and not limitation, FIG. 1 illustrates a schematic diagram view 100 of a conventional fuel dispensing system. A component or a feature that is common to more than one drawing is indicated with the same reference number in each of the drawings.

This application has related subject matter to and hereby incorporates by reference in their entirety the following: U.S. Application Ser. No. 61/750,668; filed Jan. 9, 2013 and U.S. Application Ser. No. 13/920,548, filed Jun. 18, 2013; U.S. Application Ser. No. 61/661,027 filed on Jun. 18, 2012; and U.S. Application Ser. No. 12/500,742, filed on Jul. 10, 2009.

As noted above, conventional fuel dispensers permit customers to dispense fuel into customer vehicles. As shown in diagram 100, a customer drives a vehicle 110 up to a fuel dispenser 115 (e.g. a "gas pump") to begin the fueling process. The customer opens a fuel port on the vehicle (not shown), selects a desired fuel grade 120 (or fuel type) and dispenses fuel into vehicle 110. Payment can occur prior or post fueling (generally depending on payment type). Additional steps can be included or excluded as necessary.

Figure 2:
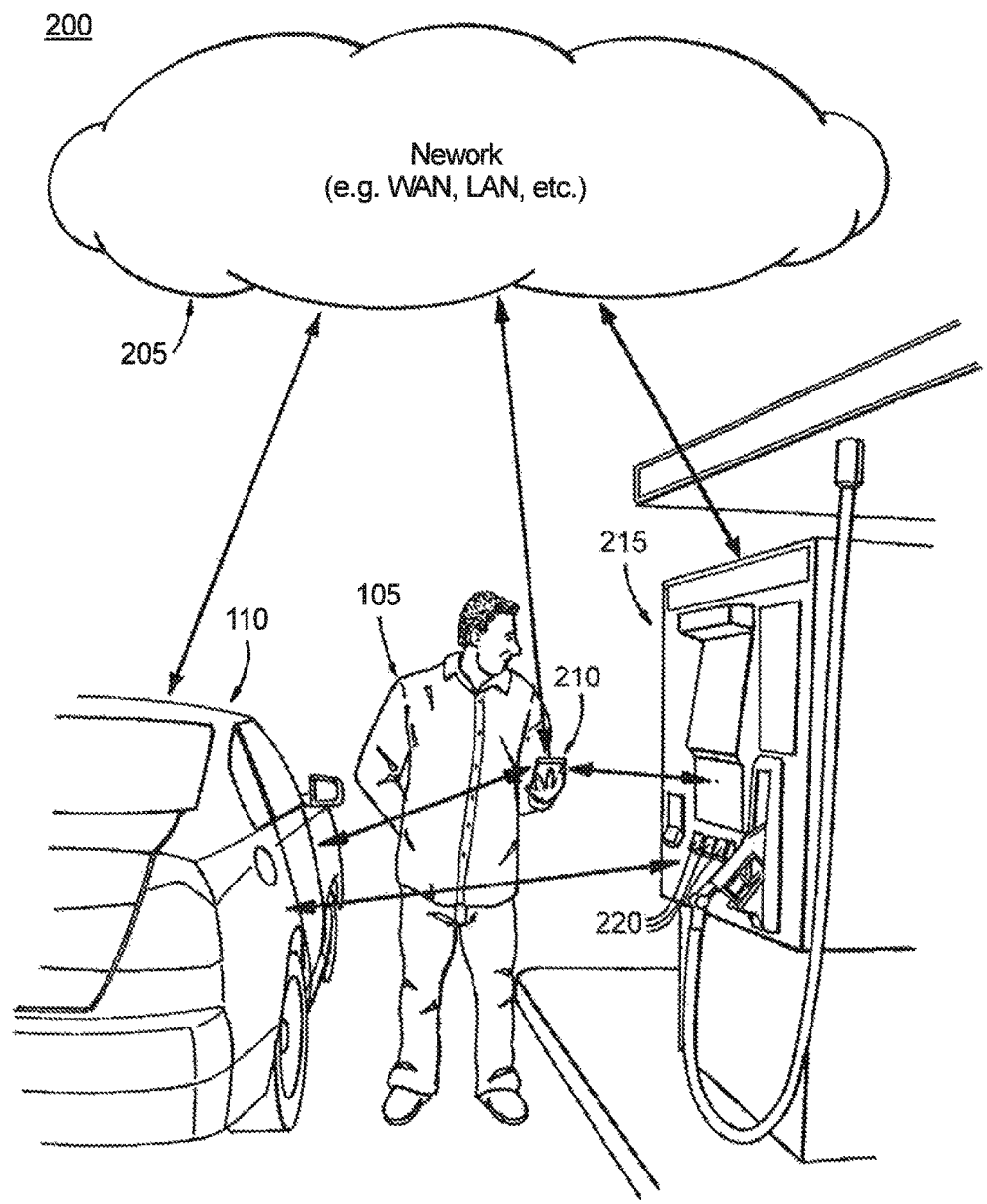
FIG. 2 illustrates a schematic diagram view of an enhanced fuel dispensing system constructed in accordance with the present disclosure.

FIG. 2 illustrates a schematic diagram view of a smart or enhanced fuel dispensing system 200 constructed in accordance with the present disclosure. As shown, various devices communicate with each other and/or with a network 205 (e.g., a WAN, LAN, etc.), discussed in greater detail below.

Smart fueling techniques, which are provided by dispensing system 215 create an environment that supports communication amongst the vehicle 110, a customer device 210 (e.g., a mobile phone, tablet, computing device, wearable device, etc.), and a smart fuel dispenser 215. Notably, various communications options exist amongst each of these devices. For example, each of the vehicle 110, the customer device 210, and fuel dispenser 215 can communicate directly with each other and/or can communicate through a network.

Although fuel dispenser 215 is shown as a physical standalone fueling station, it is expressly contemplated that fuel dispenser 215 can be part of and communicate with a larger distributed processing system (e.g., the cloud).

As discussed herein, vehicle 110 includes one or more onboard diagnostic (OBD) systems that generate telematics data, including vehicle diagnostic data. With respect to telematics data, generally telematics represents a mix of hardware and software telecommunications technology that conveys data or information for the purpose of improving business services or functions. In the automotive space, telematics has evolved to also include vehicle diagnostic data, global positioning satellite (GPS) data corresponding to the vehicle, support services data and the like.

Figure 3:
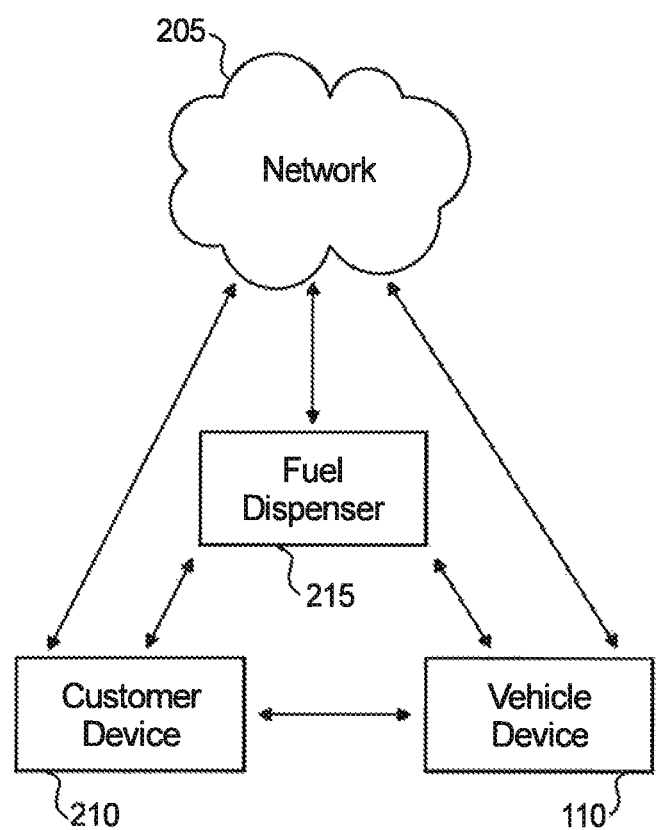
FIG. 3 illustrates an example view of a communication network, showing communication amongst devices shown in FIG. 2.

FIG. 3 illustrates an example view of a communication network 300, showing communication amongst devices/nodes shown in FIG. 2. Communication network 300 comprises various nodes/devices interconnected by various methods of communication. For instance, network 300 supports wired links as well as wireless communication media, where certain nodes may be in communication with other nodes, e.g., based on distance, signal strength, current operational status, location, etc. Notably, each of the illustrated devices, fuel dispenser 215, customer device 210 and vehicle device 110 include appropriate hardware and software to support such communication.

Communication network 300 represents a geographically distributed collection of nodes/devices interconnected by communication links and segments for transporting data there-between. Network 300 can include various types of networks, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. Moreover, as discussed in greater detail below, communication network 300 supports various types of protocols. Those skilled in the art will understand that any number of nodes, devices, links, protocols, etc. may be used in the communication network 300, and that the view shown herein is for simplicity.

Figure 4:
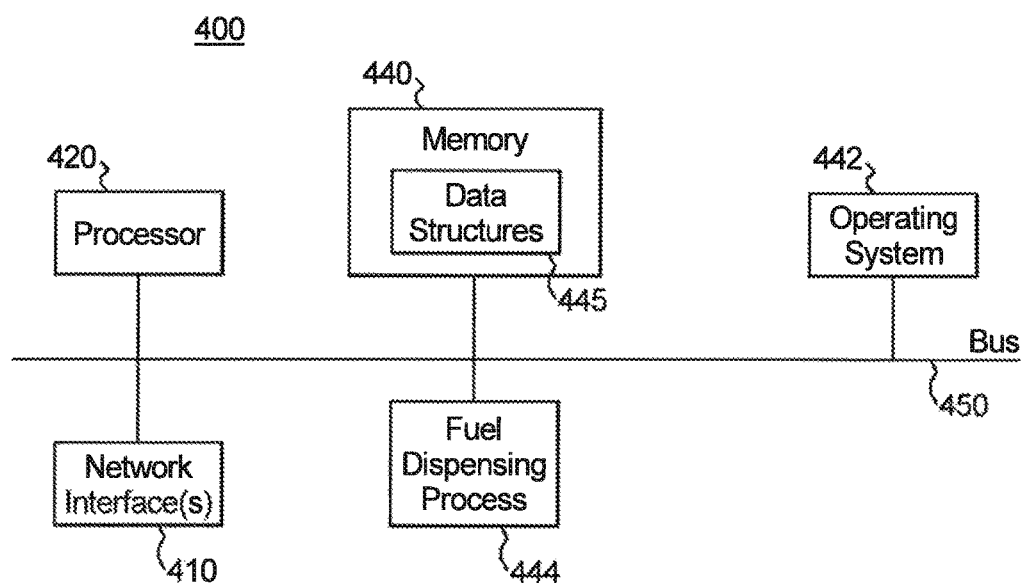
FIG. 4 illustrates one of the example network devices shown in FIG. 3.

FIG. 4 illustrates one of the example network devices shown in FIG. 3. For example, FIG. 4 represents hardware common to fuel dispenser 215, customer device 210, and vehicle device (e.g., a vehicle OBD, etc.), where appropriate. For simplicity, the device shown in FIG. 4 is generally referenced as 400.

Device 400 may comprise one or more network interfaces 410, at least one processor 420 (e.g., an 8-64 bit microcontroller), and a memory 440 interconnected by a system bus 450, as well as a power supply 460 (e.g., battery, plug-in, etc.).

The network interface(s) 410 contain the mechanical, electrical, and signaling circuitry for communicating data over physical and/or wireless links coupled to the network 300. The network interfaces may be configured to transmit and/or receive data using a variety of different communication protocols, including, inter alia, TCP/IP, UDP, wireless protocols (e.g., IEEE Std. 802.15.4, WiFi, Bluetooth®, LTE, 3GPP, common carrier protocols, Near Field Communication (NFC), and the like).

Memory 440 comprises a plurality of storage locations that are addressable by the processor 420 and the network interfaces 410 for storing software programs and data structures associated with the embodiments described herein. Notably, certain devices may have limited memory or no memory (e.g., no memory for storage other than for programs/processes operating on the device). The processor 420 may comprise necessary elements or logic adapted to execute the software programs and manipulate data structures 445, e.g., vehicle data (e.g., telematics, diagnostics, etc.). An operating system 442, portions of which are typically resident in memory 440 and executed by the processor, functionally organizes the device by, inter alia, invoking operations in support of software processes and/or services executing on the device. These software processes and/or services may comprise fuel dispensing process 444. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the fuel dispensing techniques herein (e.g., according to the functionality of a similar process). Fuel dispensing process (services) 444 contains computer executable instructions executed by the processor 420 to perform functions such as communicating data amongst the various devices, permitting or preventing fuel dispensing, providing recommendations for display to customers, notifying customers of statements, payments, and the like, as discussed herein.

Illustratively, the techniques described herein may be performed by hardware, software, and/or firmware, such as in accordance with the fuel dispensing process 444, which may contain computer executable instructions executed by the processor 420 (or independent processor of interfaces 410) to perform functions relating to the techniques described herein.

Figure 5:
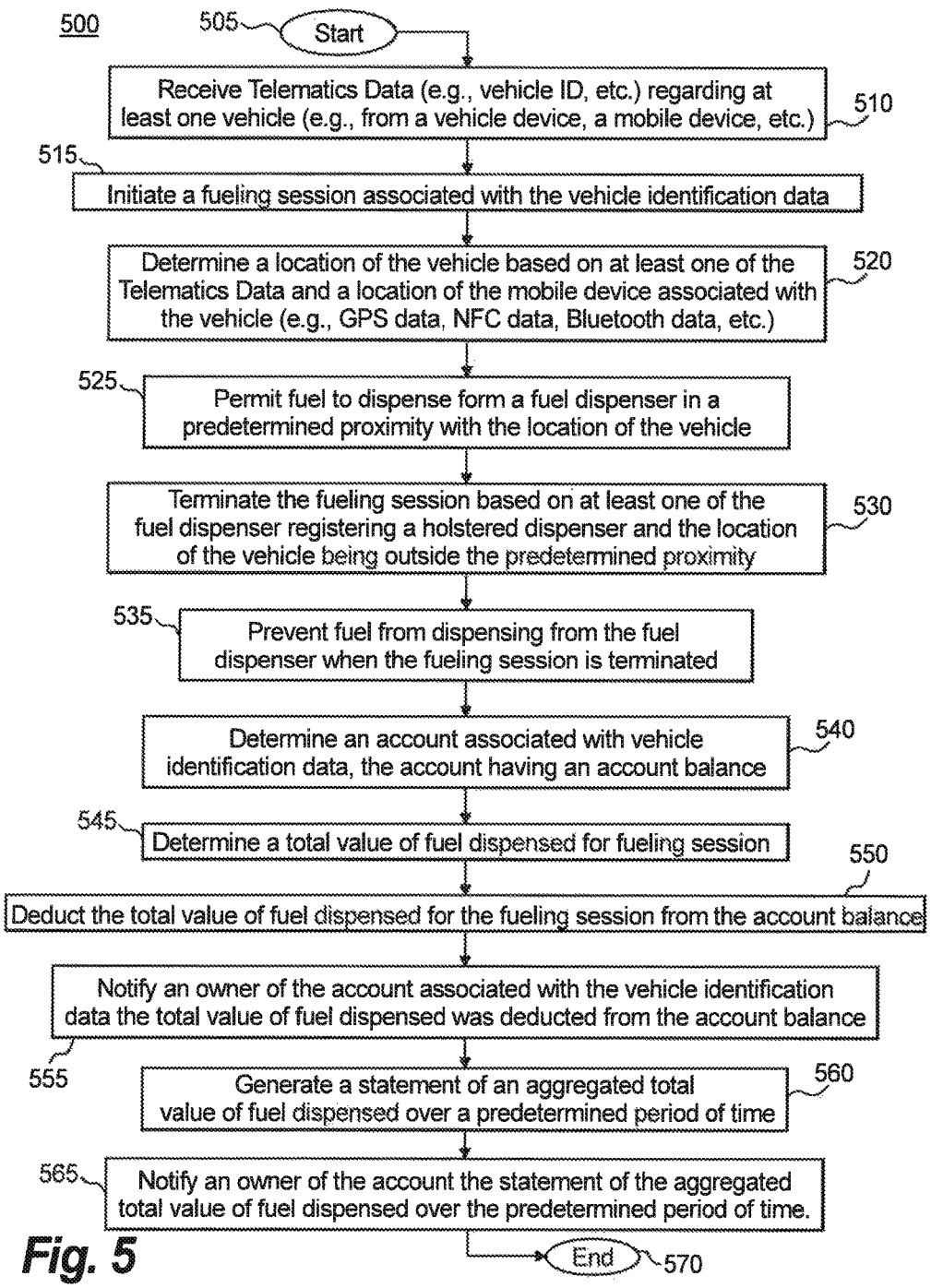
FIG. 5 illustrates an example simplified procedure for operating a fuel dispensing apparatus, particularly from the perspective of the fuel dispensing apparatus.

FIG. 5 illustrates an example simplified procedure 500 for operating a fuel dispensing apparatus, particularly from the perspective of the fuel dispensing apparatus, in accordance with one or more embodiments of fuel dispensing process 444.

Procedure 500 begins at step 505 and continues to step 510 where the fuel dispensing apparatus (i.e., one or more modules of fuel dispenser 215) receives telematics data (e.g., vehicle id, etc.) regarding at least one vehicle. Such telematics data can be derived from a vehicle device (e.g., OBD, etc.), a customer device 210 (e.g., a mobile phone, etc.), and the like. Once received, the fuel dispenser initiates, at step 515, a fueling session associated with the vehicle identification data. At step 520, the fuel dispenser determines a location of the vehicle based on at least one of the telematics data and a location of the mobile device associated with the vehicle (e.g., GPS data, NFC data, Bluetooth® data, etc.).

While the vehicle remains in a predetermined proximity of the fuel dispenser, the fuel dispenser, at step 525, permits fuel to dispense. Once fueling is finished, the fuel dispenser registers completion (e.g., by a distance of the vehicle to the dispenser exceeding the predetermined proximity, holstering the fuel nozzle, etc.) and at step 530, the fuel dispenser terminates the fueling session. Additionally, fuel dispenser prevents fuel from dispensing, at step 535, when the fueling session is terminated.

In certain embodiments, the fuel dispenser also determines, as shown in step 540, an account associated with vehicle identification data. The account can have an account balance and/or can operate on credit-based payments. With an account balance, the fuel dispenser, at step 545, determines a total value of fuel dispensed for the fueling session and, at step 550, deducts the total value of fuel dispensed for the fueling session from the account balance. Additionally, the fuel dispenser notifies (step 555) the owner of the account associated with the vehicle identification data that the total value of fuel dispensed was deducted from the account balance. The owner can be notified in either the account balance situation or the credit-based payment situation electronically (e.g., email, text message, etc. - step 560), in monthly or otherwise periodic statements (electronic or hard-copy - step 565), and the like. Also, the owner can be notified of account balances when predetermined thresholds are exceeded and/or if the vehicle of being refueled by someone having a different mobile device than that of the owner. Procedure 500 subsequently ends at step 570, but may continue to step 510 where, as discussed above, the fuel dispenser receives telematics data.

Figure 6:
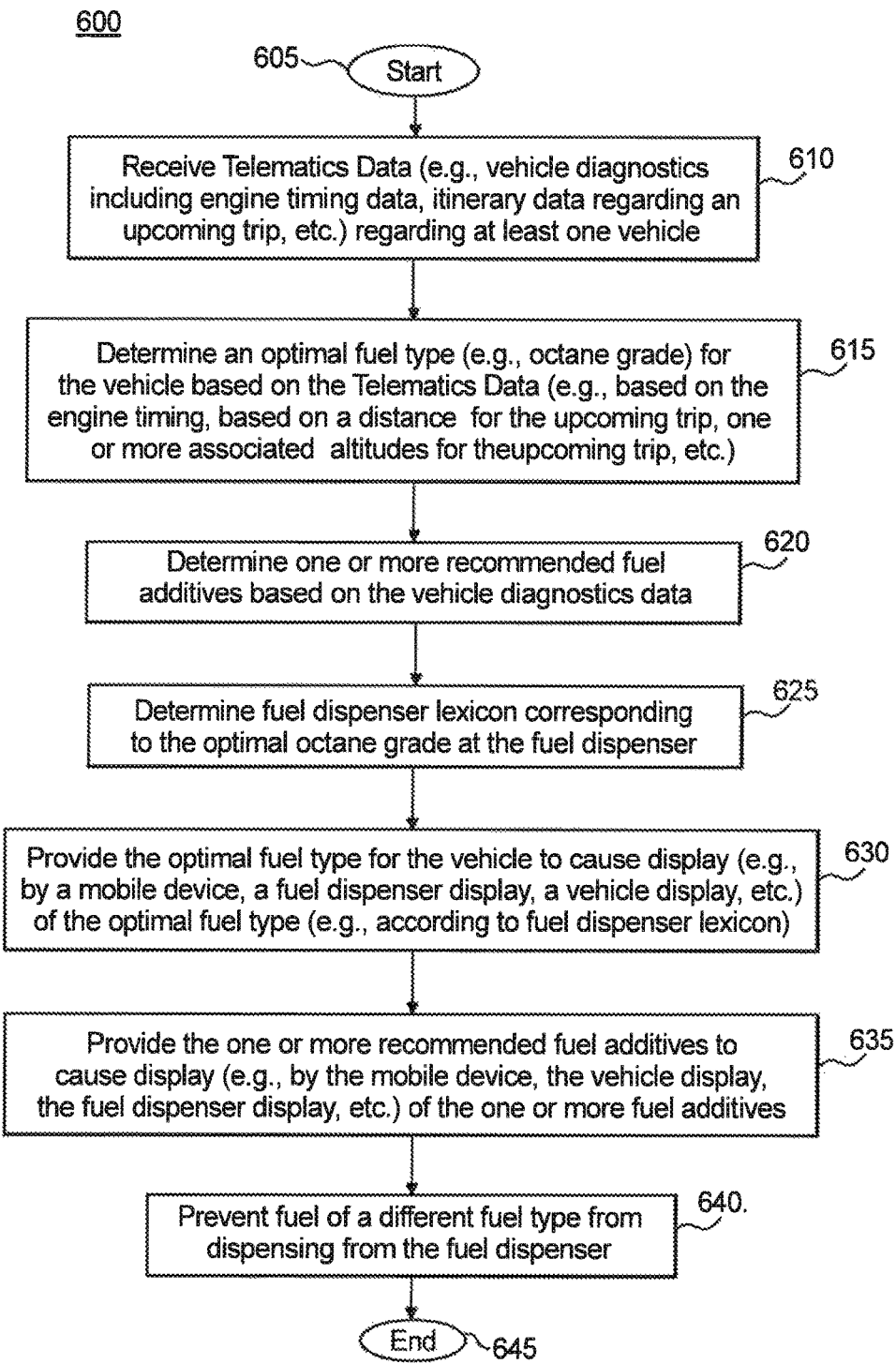
FIG. 6 illustrates another example simplified procedure for operating the fuel dispensing apparatus, particularly from the perspective of the fuel dispensing apparatus.

FIG. 6 illustrates another example simplified procedure 600 for operating the fuel dispensing apparatus, particularly from the perspective the fuel dispensing apparatus, in accordance with one or more embodiments of fuel dispensing process 444.

Procedure 600 begins at step 605 and continues to step 610 where the fuel dispenser receives telematics data regarding a vehicle. As discussed above, telematics data can include vehicle diagnostic information such as engine timing, car tire pressure, car systems notifications, alerts, alarms, and may also include itinerary data regarding upcoming trips. With respect to the telematics data, it may be generated by the vehicle (OBD) and/or the customer device (e.g., mobile phone, etc.). For example, the itinerary data may be generated from the customer mobile device, which links can pull data from a customer's calendar module/application.

Next, at step 615, the fuel dispenser determines an optimal fuel type such as an octane grade for the vehicle and based on the telematics data. For example, the engine timing may require certain fuel grades to prevent knocking. Additionally, for an upcoming trip (itinerary data), the fuel dispenser can determine a distance of the trip and even determine an altitude-specific fuel grade based on the location(s) of the trip.

Additionally, the fuel dispenser determines one or more recommended fuel additives (step 620) for the vehicle based on the vehicle diagnostics data and display such additives (step 635). Certain locals may have varying nomenclature or lexicon for fuel types (e.g., "super"; "super+", "regular", and the like). Accordingly, the fuel dispenser, at step 625, determines fuel dispenser lexicon corresponding to the optimal octane grade at the fuel dispenser, and at step 630, the fuel dispenser provides the optimal fuel type for the vehicle to cause display of the optimal fuel type. For example, the fuel dispenser may communicate the appropriate optimal fuel type to a customer device, display the optimal fuel type on a vehicle display, display the optimal fuel type on a display of the fuel dispenser, etc. The fuel dispenser operating in accordance to procedure 600 also prevents (step 640) fuel of a different/non-optimal fuel type from dispensing. Procedure 600 subsequently ends at step 645, but may begin again at step 610 where, as discussed above, the fuel dispenser receives telematics data regarding a vehicle.

It should be noted that certain steps within procedures 500-600 may be optional and that the steps shown in FIGS. 5-6 are merely examples for illustration -- certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for improved smart fuel dispensing techniques. In particular, the techniques herein significantly improve the customer experience and prevent damage to vehicles (e.g., from filling a vehicle with improper fuel grades). Moreover, using the telematics data from a customer's vehicle, various recommendations or enhancements can be provided to the customer, as discussed above.

While there have been shown and described illustrative embodiments for fuel dispensing, it is to be understood that various other adaptations and modifications may be made within the spirit and scope of the embodiments herein. For example, the embodiments have been shown and described herein with relation to a physical fuel dispenser. However, the embodiments in their broader sense are not as limited, and may, in fact, be used with various distributed processing systems separate and apart from the fuel dispenser.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus comprising:
   one or more network interfaces adapted to communicate in a communication network;
   a memory configured to store one or more processes;
   a processor adapted to execute the one or more processes, the processor when executing the one or more processes, is operable to:
   receive telematics data regarding at least one vehicle from at least one of a vehicle device and a mobile device associated with the vehicle wherein the telematics data includes vehicle identification data;
   determine a location of the vehicle based on at least one of the telematics data and a location of the mobile device associated with the vehicle;
   determine that the location of the vehicle is within a predetermined proximity of a fuel dispenser;
   determine a fuel type based on the vehicle identification data;
   determine scope of fueling permission associated with the vehicle identification data; and
   initiate, by the fuel dispenser, a fueling session contingent upon the determined scope of fueling permission, the location of the vehicle, and the fuel type,
   wherein the fueling session is permitted to proceed while the location is within a predetermined proximity of the fuel dispenser, and
   wherein the fueling session is terminated when the location of the vehicle exceeds the predetermined proximity between the vehicle and the fuel dispenser.

2. The apparatus recited in claim 1, wherein the processor when executing the one or more processes, is further operable to:
   terminate the fueling session further based on the fuel dispenser registering a holstered dispenser; and
   prevent fuel from dispensing from the fuel dispenser when the fueling session is terminated.

3. The apparatus of claim 1, wherein the processor is further operable to determine the location of the vehicle based on a beacon signal transmitted between the vehicle and the fuel dispenser.

4. The apparatus of claim 1, wherein the processor is further operable to:
   determine an account associated with vehicle identification data, the account having an account balance;
   determine a total value of fuel dispensed for the fueling session;
   deduct the total value of fuel dispensed for the fueling session from the account balance; and
   notify an owner of the account associated with the vehicle identification data the total value of fuel dispensed was deducted from the account balance.

5. The apparatus as recited in claim 1, wherein the processor when executing the one or more processes, is operable to provide the fuel type for the vehicle causing display of the fuel type on at last one of the mobile device, a fuel dispenser display, and a vehicle display.

6. The apparatus of claim 1, wherein the processor is further operable to prevent fuel of a different fuel type from dispensing from the fuel dispenser.

7. The apparatus of claim 1, wherein the processor is further operable to cause display of one or more recommended fuel additives on at least one of the mobile device, a fuel dispenser display, and a vehicle display.

8. The apparatus of claim 1, wherein the processor is further operable to determine an octane grade for the fuel type.

9. The apparatus of claim 1, wherein the telematics data includes itinerary data regarding at least one upcoming trip and wherein the processor is further operable to determine at least one of a distance for the upcoming trip and one or more associated altitudes for the upcoming trip such that the processor is operable to determine the fuel type.

10. A method, comprising:
    receiving telematics data regarding at least one vehicle from at least one of a vehicle device and a mobile device associated with the vehicle wherein the telematics data includes vehicle identification data;
    determining a location of the vehicle based on at least one of the telematics data and a location of the mobile device associated with the vehicle;
    determining that the location of the vehicle is within a predetermined proximity of a fuel dispenser;
    determining a fuel type based on the vehicle identification data;
    determining scope of fueling permission associated with the vehicle identification data; and
    initiating, by the fuel dispenser, a fueling session contingent upon the determined scope of fueling permission, the location of the vehicle, and the fuel type,
    wherein the fueling session is permitted to proceed while the location is within a predetermined proximity of the fuel dispenser, and
    wherein the fueling session is terminated when the location of the vehicle exceeds the predetermined proximity between the vehicle and the fuel dispenser.

11. The method of claim 10, further comprising:
    terminating the fueling session further based on the fuel dispenser registering a holstered dispenser; and
    preventing fuel from dispensing from the fuel dispenser when the fueling session is terminated.

12. The method of claim 10, further comprising:
    determining an account associated with vehicle identification data, the account having an account balance;

determining a total value of fuel dispensed for the fueling session;

deducting the total value of fuel dispensed for the fueling session from the account balance; and notifying an owner of the account associated with the vehicle identification data the total value of fuel dispensed was deducted from the account balance.

13. A system comprising:

means for receiving telematics data regarding at least one vehicle from at least one of a vehicle device and a mobile device associated with the vehicle wherein the telematics data includes vehicle identification data;

means for determining a location of the vehicle based on at least one of the telematics data and a location of the mobile device associated with the vehicle; means for determining that the location of the vehicle is within a predetermined proximity of a fuel dispenser;

means for determining a fuel type based on the vehicle identification data;

means for determining scope of fueling permission associated with the vehicle identification data; and means for initiating a fueling session contingent upon the determined scope of fueling permission, the location of the vehicle, and the fuel type, wherein the fueling session is permitted to proceed while the location is within a predetermined proximity of the fuel dispenser, and wherein the fueling session is terminated when the location of the vehicle exceeds the predetermined proximity between the vehicle and the fuel dispenser.

14. The system of claim 13, further comprising:

means for terminating the fueling session further based on the fuel dispenser registering a holstered dispenser; and means for preventing fuel from dispensing from the fuel dispenser when the fueling session is terminated.

15. The system of claim 13, further comprising:

means for determining an account associated with vehicle identification data, the account having an account balance;

means for determining a total value of fuel dispensed for the fueling session;

means for deducting the total value of fuel dispensed for the fueling session from the account balance; and means for notifying an owner of the account associated with the vehicle identification data the total value of fuel dispensed was deducted from the account balance.

* * * * *